No. 789,798. PATENTED MAY 16, 1905.
H. F. DETERDING.
SEED COVERER AND END GATE FOR FURROW OPENERS.
APPLICATION FILED SEPT. 10, 1904.
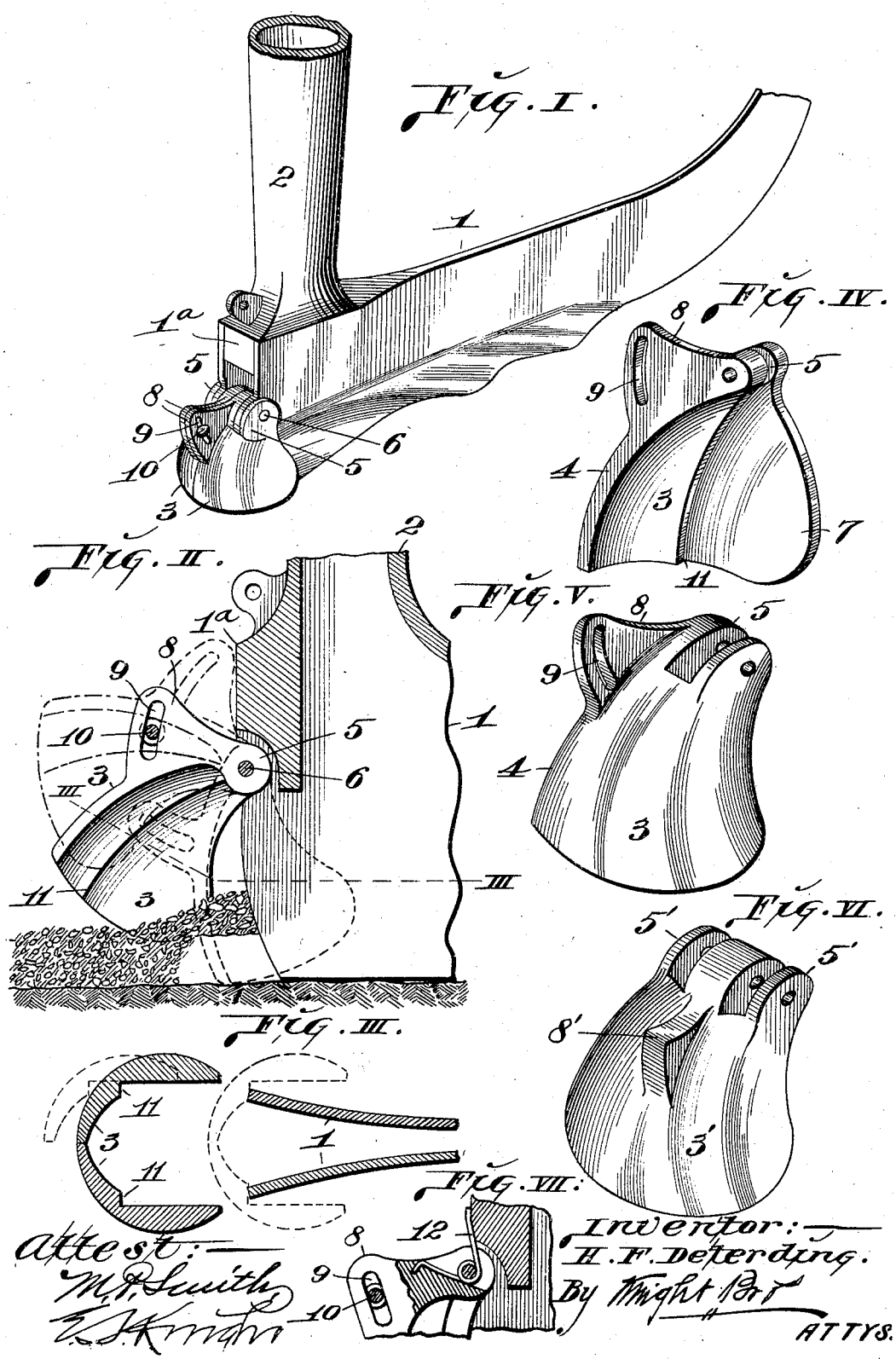

No. 789,798. Patented May 16, 1905.

UNITED STATES PATENT OFFICE.

HENRY F. DETERDING, OF ST. LOUIS, MISSOURI.

SEED-COVERER AND END-GATE FOR FURROW-OPENERS.

SPECIFICATION forming part of Letters Patent No. 789,798, dated May 16, 1905.

Application filed September 10, 1904. Serial No. 223,946.

*To all whom it may concern:*

Be it known that I, HENRY F. DETERDING, a citizen of the United States, residing at the city of St. Louis, State of Missouri, have invented certain new and useful Improvements in Seed-Coverers and End-Gates for Furrow-Openers, of which the following is a full, clear, and exact description, reference being had to the accompanying drawings, forming part of this specification.

My invention relates to a device pivotally connected to the furrow-opener of a seeder or planter for utility in gathering the soil at the sides of a furrow made by said opener and carrying it inwardly over seed dropped through the chute of the opener to cover said seed.

The device is also of utility in preventing the entrance of soil into the rear end of the furrow-opener to clog the seed-opening therein when the opener is moved rearwardly, as in backing the seeder or planter and turning corners on the land being planted.

In the drawings illustrating my improvement I have shown my device applied to a furrow-opener in the form of a shoe.

Figure I is a perspective view of a planter furrow-shoe and its seed-chute with my end-gate shown applied to said shoe. Fig. II is an enlarged vertical longitudinal section through the rear end of the planter-shoe and illustrating one of the end-gate sections in the elevated position assumed in the act of seed-covering. Fig. III is a longitudinal horizontal section taken on line III III, Fig. II. Fig. IV is a perspective view looking at the inside face of one of the end-gate sections. Fig. V is a perspective view of one of the end-gate sections looking at the exterior thereof. Fig. VI is a perspective view of a modification of the end-gate, and Fig. VII is a section illustrating a spring applied to an end-gate section to hold it yieldingly depressed.

1 designates the furrow-shoe or furrow-opener of a planter, which may be of any common design, the shoe being channeled to receive seed delivered thereto from the surmounting chute 2.

Referring first to my seed-coverer and end-gate as illustrated in Figs. I and V, inclusive, 3 represents mating sections each of arc shape in cross-section and having inner plain edges 4, that oppose each other. Each section is provided at its upper end with a fork 5, that is fitted to one of the sides of the furrow-shoe 1 at the rear end of the shoe. 6 is a pivot-pin that passes through said forks and furrow-shoe sides to swingingly connect the sections 3 to the shoe. The sections are thus disposed at the rear end of the shoe to partake of rise-and-fall motions while working on or in the soil at the sides of the furrow produced by the shoe. As the seed-coverer and end-gate moves forwardly at the rear of its shoe the forward blade edges 7 of the sections enter into the soil at the sides of the furrow, as illustrated in Fig. II, and the soil is gradually gathered to the center of the furrow at the point of deposit of the seed, thereby covering the seed, the said disturbed soil after being deposited on the seed being traversed by the rear end of the gate, which is sufficiently elevated above the soil to remain undisturbed as it moves over the center of the furrow. In instances where only a shallow cut is made by the furrow-shoe the seed-coverer and end-gate becomes elevated very slightly in performing the service for which it is designed, whereas if a deeper cut is made by the shoe the attachment is elevated to a greater extent. These positions are illustrated in full lines and dotted lines in Figs. II and III. I prefer to make my seed-cover and end-gate of sections movable independently of each other for the reason that by so constructing them either section may have freedom of movement in riding over any inequalities of ground in the furrow or obstructions without the other section being interfered with. Each section 3 bears a lug 8, extending rearwardly from the section at its inner edge, and in said lugs are slots 9, that receive a bolt 10. Provision is thus made for holding the sections from spreading, while permitting of their movement independently of each other. This arrangement also provides for the binding of the sections together to operate as a unit, if it is desired to so use them. The lugs 8 also serve to limit the vertical movement of the sections 3 by striking against the rear wall 1ª of the furrow-shoe 1. Within each section 3 is a shoulder 11, that serves to limit the forward movement of the sections by striking against the rear ends of the furrow-shoe, as illustrated in dotted lines, Fig. III.

I prefer to make the sections of my seed-coverer and end-gate of sufficient weight to cause them to remain normally in lowered positions by gravity; but, if desired, the spring 12 may be utilized, as illustrated in Fig. VII, the spring being wound around the pivot-bolt 6, that connects the coverer and end-gate to the furrow-shoe, and having its arms bearing against the coverer and end-gate and the rear wall $1^a$ of the furrow-shoe.

In Fig. VI, I have illustrated a modification in which the seed-coverer and end-gate is shown as a single member 3', that is of a shape corresponding to the shape of the two mating sections hereinbefore described and is provided with the forks 5' to receive the pivot-pin that connects it to the furrow-shoe. This coverer and end-gate is provided with the stop-lug 8'.

I am aware that corn-drills have heretofore been provided with hoes or blades for utility in covering seeds deposited by the drill, these hoes or blades having been usually set at various angles by means of bolts and ratchet-washers. These appliances are not self-flexible with respect to the furrow-shoe, and are therefore widely different from the construction of my coverer and end-gate, that has the multiple functions of covering the seed deposited through the furrow-shoe by gathering soil from the sides of the furrow and preventing the ingress of soil into the shoe at its rear end.

I claim as my invention—

1. The combination with a furrow-opener, of a seed-coverer and end-gate of semicircular shape flexibly connected to the rear end of said opener, substantially as set forth.

2. The combination with a furrow-opener, of a seed-coverer and end-gate of semicircular shape flexibly connected to said opener and having its sides or blades projecting forwardly to draw the soil at the sides of the furrow toward the center of the furrow, substantially as set forth.

3. The combination with a furrow-opener, of a seed-coverer and end-gate consisting of sections hinged to said opener, substantially as set forth.

4. The combination with a furrow-opener, of a seed-coverer and end-gate consisting of arc-shaped sections hinged to said opener, substantially as set forth.

5. The combination with a furrow-opener, of a seed-coverer and end-gate consisting of sections hinged to said opener, and means for uniting said sections, substantially as set forth.

6. The combination with a furrow-opener, of a seed-coverer and end-gate consisting of sections hinged to said opener, and lugs projecting from said sections, substantially as set forth.

7. The combination with a furrow-opener, of a seed-coverer and end-gate hinged to said opener, and a stop-lug carried by said coverer and end-gate adapted to strike against said opener to limit the movement of said coverer and end-gate, substantially as set forth.

8. The combination with a furrow-opener, of a seed-coverer and end-gate hinged to said opener; said seed-coverer and end-gate being provided interiorly with shoulders adapted to strike against the rear end of the opener to limit the forward movement of the seed-coverer and end-gate, substantially as set forth.

HENRY F. DETERDING.

In presence of—
BLANCHE HOGAN,
M. P. SMITH.